Aug. 13, 1963         L. R. HAGNER         3,100,830
APPARATUS FOR PERCUSSIVELY WELDING ELECTRICAL
COMPONENTS TO CIRCUIT BOARDS
Filed Nov. 10, 1961                               4 Sheets-Sheet 1
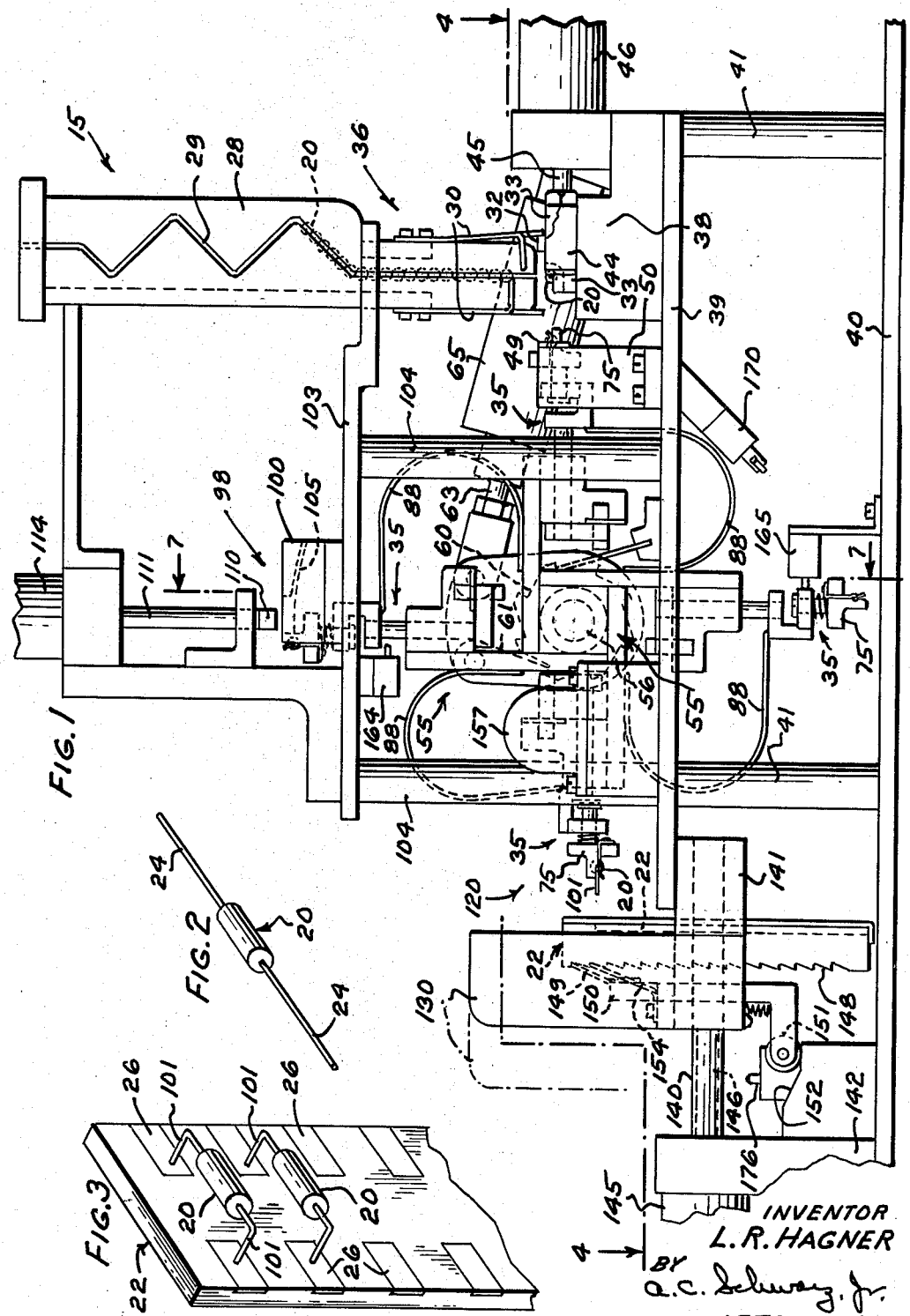
INVENTOR
*L. R. HAGNER*
BY
*a.c. Schwarz, jr.*
ATTORNEY

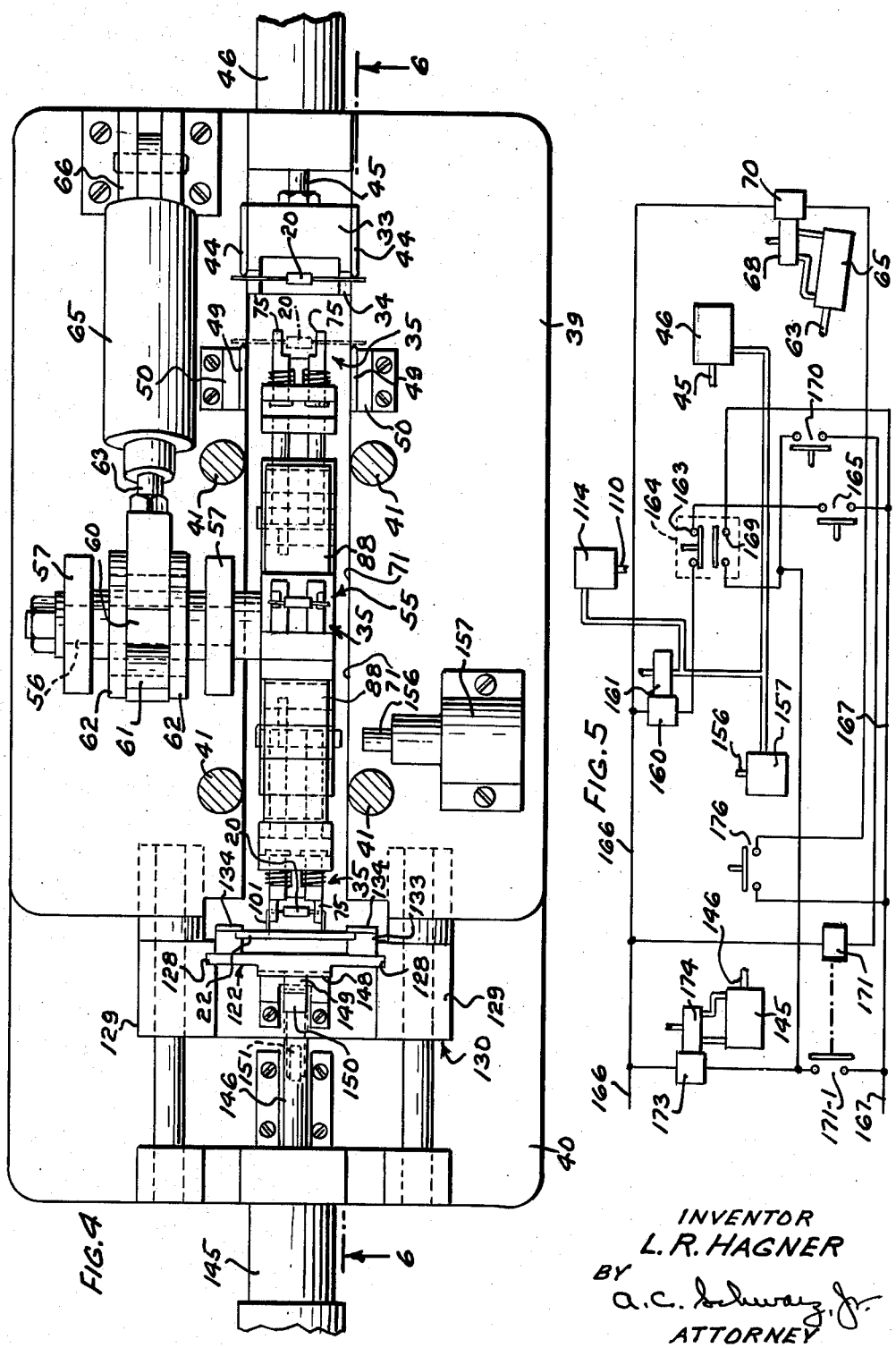

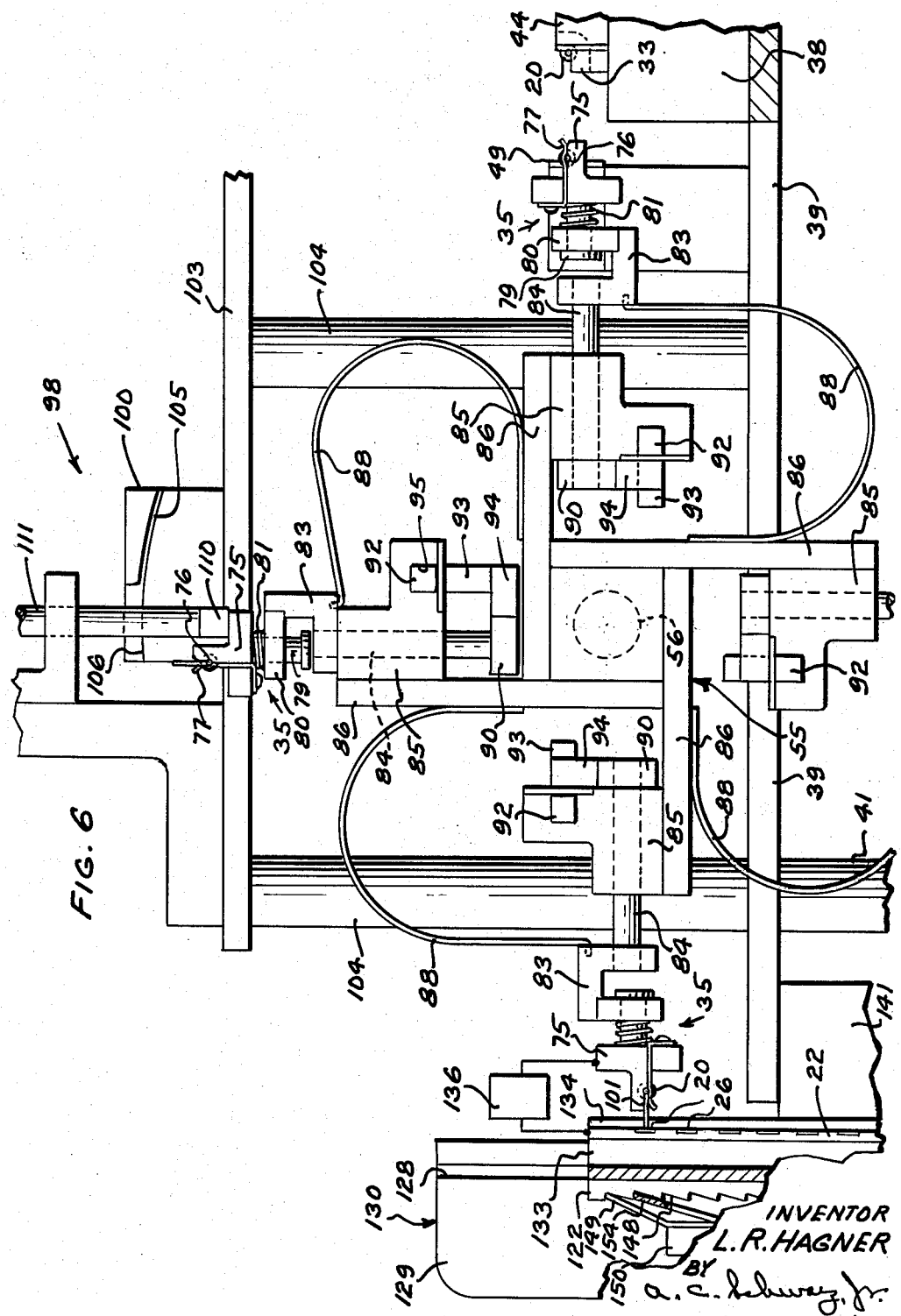

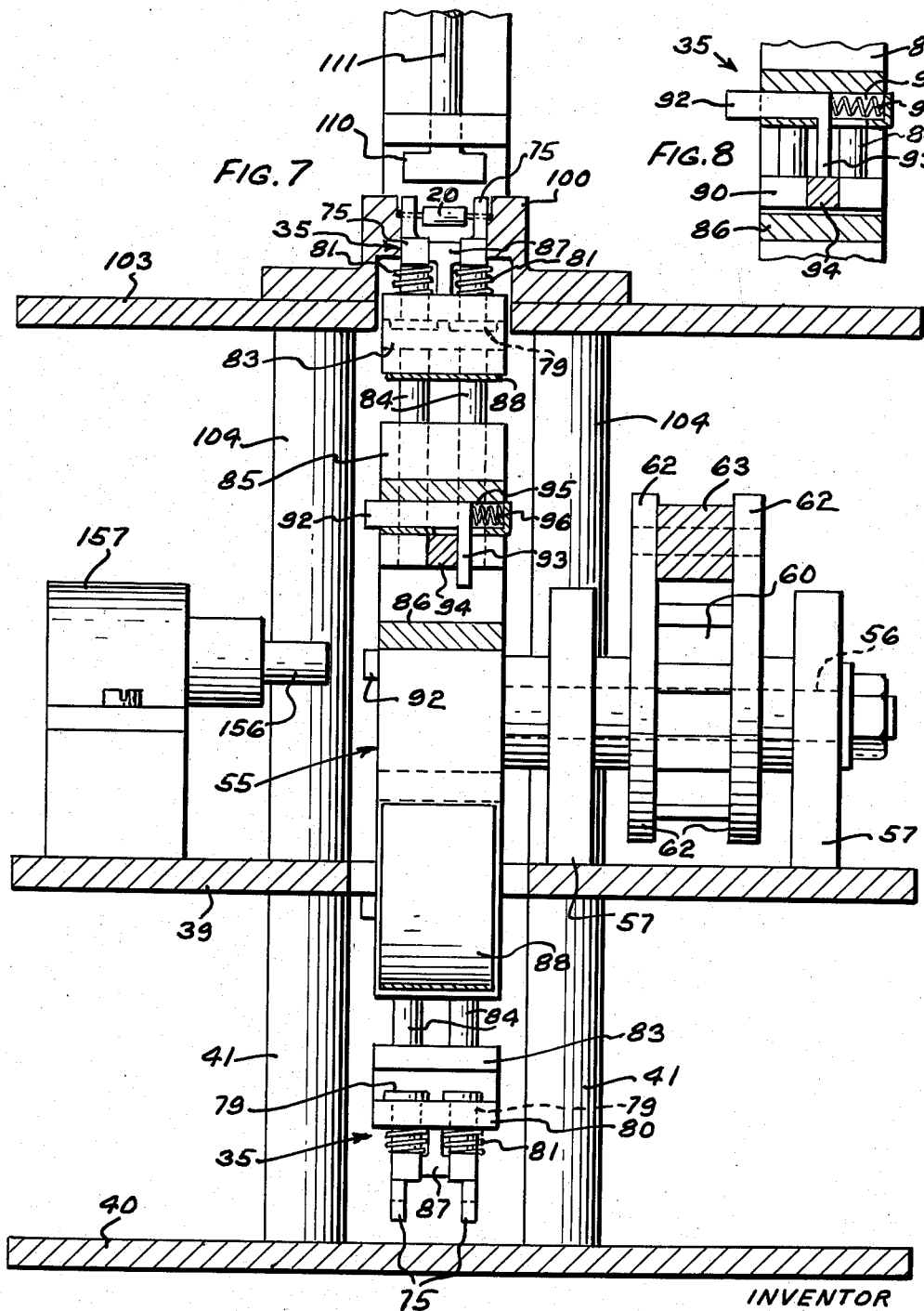

United States Patent Office 3,100,830
Patented Aug. 13, 1963

3,100,830
APPARATUS FOR PERCUSSIVELY WELDING ELECTRICAL COMPONENTS TO CIRCUIT BOARDS
Lawrence R. Hagner, Cicero, Ill., assignor to Western Electric Company, Incorporated, a corporation of New York
Filed Nov. 10, 1961, Ser. No. 151,577
5 Claims. (Cl. 219—79)

This invention relates to apparatus for percussively welding electrical components to circuit boards, and more particularly to apparatus for automatically feeding electrical components having wire leads on opposite ends thereof, shearing and forming the leads and percussively welding the components onto printed circuit boards.

An object of the invention is to provide an improved apparatus for percussively welding electrical components to circuit boards.

Another object of the invention is to provide an apparatus for automatically feeding components having leads on opposite ends thereof, shearing and bending the leads and welding the components onto printed circuit boards.

An apparatus illustrating certain aspects of the invention may include a turret having a plurality of spring loaded electrodes for releasably supporting the electrical components for indexing movement therewith to successive stations. At a loading station successive components from a magazine are fed to a mechanism that transfers the components individually to the electrode and severs the leads to a predetermined length. The turret is then indexed and the component is advanced to the second station during which the electrode cooperates with forming tools to bend the ends of the leads at right angles to the axis of the component. Pusher mechanism at the second station is then actuated to move the electrode with the component therein to a cocked or retracted position in which it is latched. The following indexing movement positions the electrode with the formed component at a welding station in alignment with a circuit board which is supported on a carrier and has terminals connected to one polarity of a welding potential, the other polarity of which is connected to the welding electrodes. Unlatching mechanism is than operated to release the electrode which carries the component into percussive engagement with selected terminals of the circuit board to effect the percussive welding of the leads thereto. The circuit board and carrier are then indexed after which the preceding operations are repeated until the required number of components have been welded to the circuit board.

Other objects, advantages and novel aspects of the invention will become apparent upon consideration of the following detailed description, in conjunction with the accompanying drawings, in which:

FIG. 1 is a fragmentary side view of the apparatus embodying the present invention for forming and welding electrical components to circuit boards;

FIG. 2 is a perspective view of one of the electrical components;

FIG. 3 is a fragmentary perspective view of a circuit board with a plurality of electrical components welded thereto;

FIG. 4 is a plan sectional view of the apparatus taken on the line 4—4 of FIG. 1;

FIG. 5 is a diagrammatic view of the control mechanism of the apparatus;

FIG. 6 is an enlarged fragmentary vertical sectional view of the apparatus taken on the line 6—6 of FIG. 4;

FIG. 7 is a fragmentary vertical sectional view of the apparatus taken on the line 7—7 of FIG. 1; and FIG. 8 is a fragmentary view of the apparatus showing a latch for holding a welding gun in retracted position.

The present apparatus 15 is designed to percussively weld electrical components 20 (FIG. 2) onto circuit boards 22 (FIG. 3), the components 20 being of the type having a pair of coaxial leads 24 which are cut to a predetermined length, bent to a predetermined shape, and welded to terminal plates 26 mounted on one face of the circuit boards 22.

A supply of the components 20 is supported in a magazine 28 with the leads 24 of the components extending through slots 29 in the magazine and engageable successively with a pair of escapement pawls 30. The pawls 30 are actuated alternately by a member 32 on a slide 33 in response to reciprocation of the latter to effect the feeding of a component onto the slide with the leads 24 resting on a pair of seats 34 of the slide in horizontal alignment with a welding gun 35 at the loading station 36 of the apparatus. The slide 33 is movable on a support 38 secured to a horizontal frame plate 39 that is mounted above and in spaced relation to a base plate 40 by a plurality of posts. Movement is imparted to the slide by a piston rod 45 of a fluid operated actuator 46 which is mounted on the support 38.

The component 20 is centrally positioned on the slide 33 with the leads 24 disposed in close proximity to a pair of shearing blades 44 on the slide 33. In response to the forward feeding movement of the slide 33, the component 20 is transferred to the welding gun 35 and the leads 24 are sheared to a predetermined length by the cooperation of the movable shear blades 44 with stationary shear blades 49 secured to brackets 50 on the horizontal frame plate 39.

In the apparatus disclosed there are four welding heads 35 mounted on a turret 55 in evenly spaced relation to each other. The turret 55 is fixed to a shaft 56 which extends horizontally from one side thereof (FIGS. 4 and 7) and is rotatably supported in a pair of bearing brackets 57 mounted on the horizontal frame plate 39. Indexing movement is imparted to the turret 55 and the welding guns 35 by mechanism including a ratchet wheel 60 fixed to the shaft 56 and a driving pawl 61 engageable therewith. The pawl 61 is pivotally supported between a pair of rocker arms 62 which are pivotally supported on the shaft 56 and are connected to one end of a piston rod 63 of a fluid operated actuator 65. The actuator 65 which is pivotally supported on a bracket 66 on the frame plate 39 effects the indexing of the turret 55 in response to the admission of compressed air to opposite alternate ends thereof under control of a valve 68 that is responsive to a solenoid 70. As shown in FIGS. 4 and 7, the horizontal frame plate 39 is slotted at 71 to provide clearance for the rotation of the turret 55 and the welding guns 35 thereon.

Each of the welding guns 35 includes a pair of welding electrodes 75 having seats 76 for receiving and supporting the leads 24 of the component 20 in a predetermined position thereon, in which position the leads are yieldably maintained by leaf springs 77 secured to the electrodes 75. Headed rods 79 extending from the electrodes are slidably mounted in apertures in a block 80 of dielectric material for individually supporting the electrodes 75 of the welding gun 35 for limited movement, the electrodes being maintained by springs 81 in normal extended positions, as shown in FIGS. 1 and 7. The block 80 of dielectric material is secured to an L-shaped metal block 83 which in turn is secured to a pair of guide rods 84 slidable in the guide block 85 that is carried by an arm 86 of the turret 55. A guide finger 87 extends from the block 80 between the welding electrodes 75 to prevent the electrodes from turning about the axis of the rods 79 thereon.

A leaf spring 88 having one end thereof anchored to the block 83 and the other end thereof secured to an arm 86 of the turret stresses the welding gun 35 for movement radially outwardly to a normal extended position in which it is stopped by a member 90 secured to the rods 84 and engageable with the guide block 85. The welding gun 35 is movable radially inwardly to a retracted position in which it is releasably held by a latch 92, the arm 93 of which engages an arm 94 of the stop member 90 (FIG. 8). The latch 92 is slidably mounted in a slot 95 in the guide block 85 for limited movement and is urged by a spring 96 to a normal operative position for latching the gun in its retracted or cocked position. With the welding gun 35 in its extended position, the arm 94 of the welding gun serves to hold the latch 92 in its inoperative position (FIG. 7).

After the component 20 has been transferred to the welding gun 35 at the loading station 36, the turret 55 is indexed to advance the welding guns to the following stations. During this indexing movement of the welding head 35 from the loading station 36 to a second station 98, the electrodes 75 of the welding gun 35 cooperate with a pair of lead bending dies 100 to effect the bending of the end portions 101 of the leads 24 at right angles to the axis of the component (FIG. 3). As shown in FIG. 7, the bending dies 100 are mounted on a horizontal slotted platform 103 and engage and bend the end portions 101 of the leads 24 projecting beyond the welding gun 35 as the welding gun and the component 20 pass therebetween. The platform 103 is supported by posts 104 on the horizontal frame plate 39. The bent portions 101 of the leads are guided in grooves 105 in the bending dies 100 and are positioned above shoulders 106 formed as an extension of the grooves 105 in the dies at the end of the indexing movement of the turret.

A pusher 110, disposed above the welding gun 35 at the second station 98, is mounted on a piston rod 111 of a fluid operated actuator 114 that is supported on a bracket 115 secured to the platform 103. In response to the operation of the actuator 114, the pusher 110 is moved downwardly to engage the pair of electrodes 75 of the welding gun 35 and move the welding gun to its retracted or cocked position as shown in FIG. 6. During this downward movement of the welding gun, the arm 94 of the stop member 90 is moved along the side of and to a position below the end of the arm 93 of the latch 92 to release the latch which is then advanced by the spring 96 to its operative position to latch the gun in its retracted or cocked position. During the downward movement of the welding gun 35 to its retracted position, the ends 101 of the leads are turned through one quarter turn by the shoulders 106 of the bending dies 100 with the end portions 101 of the leads 24 disposed substantially radial of the axis of rotation of the turret 55.

During the next complete indexing movement of the turret 55, the welding head 35 with the component 20 therein is advanced from the second station 98 to a welding station 120 with the component aligned with a predetermined portion of a wiring board 22 supported in a carrier 122 at the welding station and with the lead ends 101 in registration with a predetermined set of the terminals 26 of the wiring board.

The carrier 122 for the circuit board 22 is in the form of a plate, the edge portions of which are slidable vertically in guideways 128 of a pair of vertical guide members 129 of a carriage 130. A pair of vertically disposed rails 133 of dielectric material secured to the carrier 122 cooperate with a pair of metal strips 134 to form guideways for receiving the opposite edges of the circuit board 22 therein. Each of the metal strips 134 engages a row of terminals 26 of the wiring board 22 and as indicated diagrammatically in FIG. 6 each strip 134 is electrically connected to one polarity of a source of welding potential 136, the opposite polarity of which is connected to one of the movable electrodes 75 of the welding gun 35 by suitable commutator means (not shown).

The carriage 130 is mounted for horizontal movement on a pair of guide rods 140 (FIGS. 1 and 4) supported at opposite ends in supporting brackets 141 and 142. Horizontal reciprocation of the carriage to and from a predetermined operative position as shown in full lines in FIG. 1 is imparted by a fluid operated actuator 145, the piston rod 146 of which is connected to the carriage 130 (FIG. 4). On one side thereof the carrier 122 is provided with a row of ratchet teeth 148 with which a feed pawl 149 in the form of a flat spring cooperates to impart vertical indexing movement thereto.

The feed pawl 149 is secured to the upper end of a feed bar 150 slidably mounted for vertical movement in a guideway in the carriage 130 and carrying a cam roller 151 on the lower laterally disposed portion thereof. The roller 151 rides on a stationary cam 152 so that in response to horizontal reciprocatory movement of the carriage 130, the feed bar 150 and feed pawl 149 are reciprocated. The feed bar 150 is stressed for movement downwardly by any suitable means and a holding pawl 154 on the carriage cooperates with the feed pawl 149 to effect the indexing of the carrier in response to reciprocation of the feed bar 150.

With the welding gun 35 in the welding station 120, the latch 92 is aligned with a plunger 156 of a fluid operated actuator 157 which is supported on the horizontal frame plate 39. In response to operation of the actuator 157, the plunger 156 pushes the latch 92 to its unoperative position thereby releasing the welding gun 35 to cause the spring 88 to advance the welding gun toward the circuit board and to effect the percussive welding of the lead ends 101 to the terminals 26.

As shown diagrammatically in FIG. 5, a control mechanism is provided for effecting the sequential operation of the units of the apparatus for feeding a component to the welding gun and to shear the ends of the leads to a predetermined length at the loading station 36, to effect the bending of the leads as the component is advanced to the second station 98, to effect the movement of the welding gun to its retracted or cocked position and the turning of the lead ends 101 into radial position at the second station 98, and to effect the release of the gun and the welding of the component to the circuit board 22 and the indexing of the circuit board at the welding station 120.

The control mechanism includes a solenoid 160 for actuating a valve 161 from its normal position to an operative position to effect the flow of compressed air from a supply thereof to and the actuation of the fluid operated actuators 46, 114 and 157 at stations 36, 98 and 120, respectively. The solenoid 160 is connected in series with a pair of normally closed contacts 163 of a switch 164 and a normally open switch 165 across a pair of power lines 166, 167. The normally open switch 165 is mounted at the fourth or idle station of the apparatus and is actuated to closed position in response to the movement of a welding gun 35 to such fourth position thereby closing a circuit and effecting the energization of the solenoid 160 and the operation of the actuators 46, 114 and 157. This results in the feeding and transfer of a component to the welding gun and the shearing of the leads to a predetermined length at the loading station 36, the movement of the welding head to its retracted or cocked position and the turning of the lead ends 101 to radial position at the second station 98, and the unlatching of the welding head 35 and the percussive welding of the component 20 to the circuit board 22 at the welding station 120.

The switch 164 is positioned below the pusher 110 at the second station 98 for actuation in response to operation of the welding gun by the pusher 110 to its retracted or cocked position. The actuation of the switch 164 opens the closed contacts 163 and closes a pair of normally open contacts 169 thereby completing a circuit through the contacts 169, a normally closed switch 170 and a relay 171 resulting in the energization of the relay and the closing of its contacts 171–1. This effects the energization of a solenoid 173 which in turn effects the actuation of a valve 174 and the operation of the actuator 145 to retract the carriage 130 and cause the indexing of the carrier 122.

During the horizontal movement of the carriage 130 to its retracted position, the carriage momentarily closes a normally open switch 176 thereby effecting the energization of the solenoid 70, the actuation of the valve 68 and the operation of the actuator 65 to index the turret one-half step. From an inspection of FIG. 1, it will be noted that the ratchet 60 of the turret indexing mechanism has eight teeth so that during each indexing movement the turret is advanced through 45°. Two movements of the indexing mechanism are thus required to index the welding guns from station to station.

It will also be noted that normally closed switch 170 is positioned on the apparatus so as to be actuated to open position in response to indexing movement of the turret to an intermediate or 45° position between stations. Thus, in response to the first operation of the actuator 65 and the indexing of the welding guns to an intermediate position, the switch 170 is actuated to open position thereby effecting the deenergization of the relay 171 resulting in the deenergization of the solenoid 173 and the operation of the actuator 145 to move the carriage to its advanced position. During the advance movement of the carriage 130 to its operative position, the normally open switch 176 is momentarily closed resulting in the energization of the solenoid 70 and the operation of the actuator 65 to effect a second half step of indexing movement of the turret and the movement of the welding guns into operative positions at the several stations. With the movement of a welding gun to the fourth station, the switch 165 is again closed to initiate another cycle of operation.

The cycle of operation is repeated until the circuit board has the required number of components welded thereto at which time the apparatus is automatically stopped by suitable mechanism (not shown).

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a welding apparatus, a carrier mounted for rotation about an axis, a plurality of electrodes electrically connected individually to a source of welding potential for releasably supporting electrical components, means for mounting said electrodes on said carrier for rotary movement therewith and for movement relative thereto to and from retracted and advanced positions, resilient means on said carrier for moving said electrodes to said advanced positions, means for indexing said carrier to successively advance the electrodes to a plurality of stations, means at a first station for loading components onto said electrodes, means at a second station for moving said electrodes to the retracted positions, latch means on said carrier for releasably retaining said electrodes in the retracted positions, means at a welding station electrically connected to the source of potential for supporting an article in the path of movement of said component, and means at said welding station for releasing said latching means to effect the movement of said electrodes from the retracted position toward the advanced position and the welding of the component to the article.

2. An apparatus as defined in claim 1 including means for indexing said article supporting means in timed relation to the actuation of said carrier.

3. A welding apparatus comprising a plurality of movable electrodes for supporting electrical components therein, a carrier mounted for rotation about an axis for supporting said electrodes in spaced relation to each other for rotation therewith and for movement relative thereto toward and away from said axis to extended and retracted positions, resilient means for urging said electrodes to extended positions, means for indexing said carrier to a plurality of stations, means at one of said stations for feeding the components to said electrodes, means at a second station for moving said electrodes from the extended positions to the retracted positions, latch means on said carrier for releasably holding said electrodes in retracted positions, means at a third station for supporting a circuit board in the path of movement of said electrodes at said station, means for applying one polarity of a source of electrical potential to said circuit board and the other polarity of said source of electrical potential to said electrodes, and means at said third station for actuating said latching means to effect the movement of the electrode toward said circuit board and the percussive welding of the component to the circuit board.

4. In a welding apparatus, a carrier mounted for rotation about an axis, a plurality of electrodes electrically connected individually to a source of welding potential for releasably supporting electrical components, means for mounting said electrodes on said carrier for rotary movement therewith and for movement relative thereto toward and away from said axis to and from retracted and advanced positions, resilient means on said carrier for moving said electrodes to said advanced positions, means for indexing said carrier to advance successively the electrodes to a plurality of stations, means at one of said stations for feeding components to said electrodes, means at a second station for moving said electrodes to retracted positions, means on said carrier for latching said electrodes in retracted positions, a holder electrically connected to the source of potential for supporting a circuit board, a carriage mounted at a third station for supporting said holder and the circuit board thereon in the path of movement of said electrodes and for movement relative to the carriage transversely of said path, means at said third station for releasing said latch means to effect the percussive engagement and welding of the component to the circuit board, means for moving said carriage parallel to said path to and from operative and retracted unoperative positions in timed relation to the indexing of said carrier, and means responsive to the movement of said carriage to and from operative and unoperative positions for indexing said holder on said carriage.

5. In an apparatus for welding components having leads to articles, a carrier mounted for rotation about an axis, a plurality of electrodes electrically connected individually to a source of welding potential for releasably supporting the leads of said components, means for mounting said electrodes individually on said carrier for rotary movement therewith along a first path and for movement relative thereto along a second path transversely of said first path to and from retracted and advanced positions, resilient means on said carrier for moving said electrodes outwardly from said axis along said second path to said advanced positions, means for indexing said carrier to advance the electrodes successively to a plurality of stations, means at a first station for feeding components to said electrodes, means at a second station for moving said electrodes from said advanced position to said retracted position, means on said carrier for latching said electrodes in said retracted position, members positioned between said first and said second stations and cooperable with said electrodes for bending the end portions of the leads at right angles to the leads for movement along said first path in response to indexing movement of said carrier and for turning the bent end portions of the leads for movement along said second path in response to movement of the electrode from said advanced position to said retracted position, means at a third station electrically connected to the source of potential for supporting an article in the path of movement of said electrode, and means at said third station for releasing said latching means to effect the welding of the component to the article.

References Cited in the file of this patent

UNITED STATES PATENTS

| | | |
|---|---|---|
| 2,749,420 | Pityo | June 5, 1956 |
| 2,904,786 | Hazel et al. | Sept. 22, 1959 |
| 2,911,646 | Vossen et al. | Nov. 10, 1959 |
| 2,986,625 | Houda et al. | May 30, 1961 |
| 3,004,262 | Cubbidge et al. | Oct. 17, 1961 |